United States Patent [19]

Wachter

[11] Patent Number: 4,746,487
[45] Date of Patent: May 24, 1988

[54] STORAGE RACK FOR NUCLEAR FUEL ASSEMBLIES

[75] Inventor: William J. Wachter, Wexford, Pa.

[73] Assignee: U.S. Tool & Die, Inc., Allison Park, Pa.

[21] Appl. No.: 272,331

[22] Filed: Jun. 10, 1981

[51] Int. Cl.⁴ ............................................. G21C 19/40
[52] U.S. Cl. ..................................................... 376/272
[58] Field of Search ...................... 376/272; 250/506.1, 250/507.1

[56] References Cited

U.S. PATENT DOCUMENTS

| | | | |
|---|---|---|---|
| 3,859,533 | 1/1975 | Suvanto | 376/272 |
| 4,004,154 | 1/1977 | Bevilacqua | 376/272 |
| 4,010,375 | 3/1977 | Wachter et al. | 376/272 |
| 4,029,968 | 6/1977 | Rubinstein et al. | 376/272 |
| 4,039,842 | 8/1977 | Mollon | 376/272 |
| 4,115,700 | 9/1978 | Groves | 376/272 |
| 4,119,859 | 10/1978 | Karzmar et al. | 376/272 |
| 4,143,276 | 3/1979 | Mollon | 376/272 |
| 4,177,385 | 12/1979 | Bevilacqua | 376/272 |
| 4,177,386 | 12/1979 | Wachter et al. | 376/272 |
| 4,187,433 | 2/1980 | Zezza | 376/272 |
| 4,218,622 | 8/1980 | McMurtry et al. | 376/272 X |
| 4,243,889 | 1/1981 | Weber | 376/272 |
| 4,305,787 | 12/1981 | Rivacoba | 376/272 |

FOREIGN PATENT DOCUMENTS

| | | | |
|---|---|---|---|
| 2742736 | 4/1979 | Fed. Rep. of Germany | 376/272 |
| 2433816 | 4/1980 | France | 376/272 |

*Primary Examiner*—Deborah L. Kyle
*Assistant Examiner*—Daniel Wasil
*Attorney, Agent, or Firm*—Clifford A. Poff; Thomas H. Murray

[57] ABSTRACT

A storage rack for spent nuclear fuel rods is provided having multiple parallel tubes of polygon cross-section with their confronting surfaces having embossed buttons in engagement and having at least one pad of neutron poison material interposed between the confronting surfaces. The tube cells are secured together such that the neutron poison material effectively establishes each individual cell as a neutron isolation chamber and further functions to dampen mechanical vibrations which may be applied to the assembled storage rack.

7 Claims, 2 Drawing Sheets

U.S. Patent    May 24, 1988    Sheet 1 of 2    4,746,487
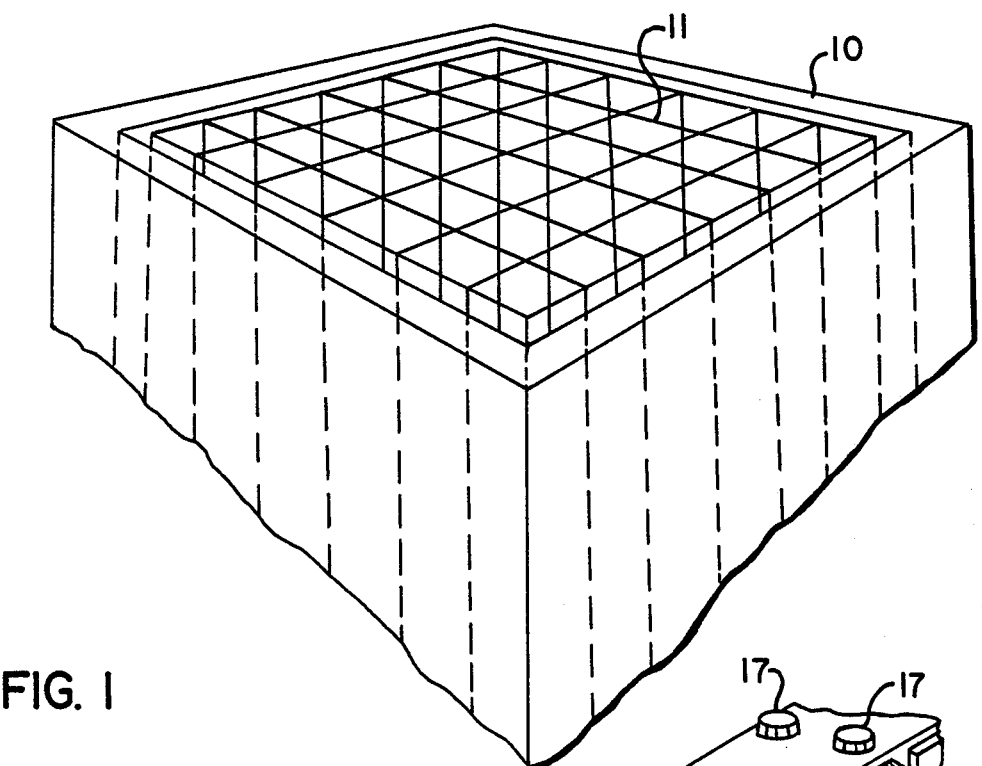
FIG. I
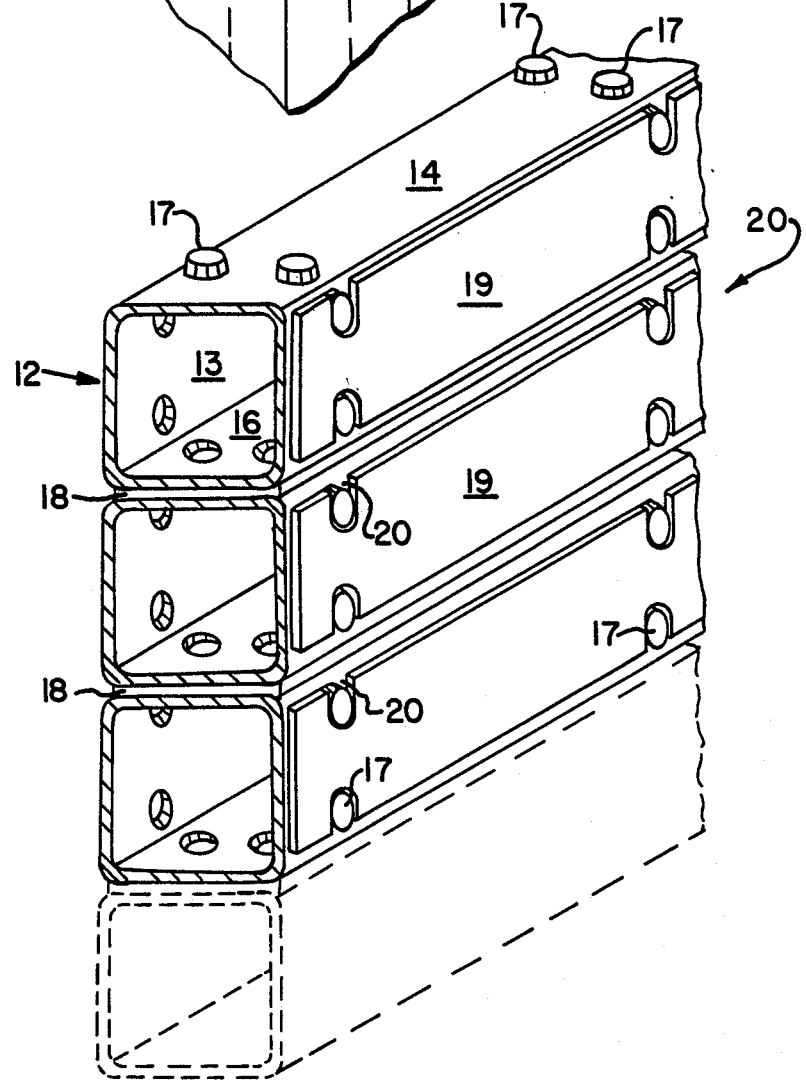
FIG. 2

STORAGE RACK FOR NUCLEAR FUEL ASSEMBLIES

BACKGROUND OF THE INVENTION

1. Field of the Invention

This invention relates to a storage rack for spent nuclear fuel assemblies.

2. Description of the Prior Art

Storage racks for nuclear fuel assemblies are described in U.S. Pat. Nos. 4,010,375, 4,177,385, 3,859,533, 4,039,842, 4,029,968, 4,004,154. The objective of each of these prior art storage racks is to provide a safe facility for confinement of spent nuclear fuel rods in water pools for extended periods until the residual radioactive emissions are reduced to a level at which the fuel assemblies can be safely removed. To prevent unwanted concentrations of neutrons, it is a common practice to position neutron poison materials within the storage racks to isolate neutrons into restricted regions of the storage rack, thereby permitting greater numbers of fuel rod assemblies to be confined safely within an established aqueous storage pool.

The storage racks typically include square or rectangular cross-section tubes which are positioned vertically in the aqueous pool, parallel to each other. The individual tubes are secured into the storage rack. Typical neutron poison materials are boron carbide, aluminum-boron, cadmium, gadolinium. A particularly useful neutron poison material, Boroflex, is a silicone rubber pad having boron carbide particles homogeneously dispersed therein.

Typically the supporting racks will contain up to about 300 individual spent nuclear fuel rod assemblies. Typical fuel rod assemblies are from about 8 to 15 feet long and about 1 to 9 inches square, each containing from 49 to 39 fuel rods. A typical aqueous storage pool has concrete walls and may be 40 feet deep.

There is a continuing need to increase the number of spent fuel rod assemblies which can be accumulated in one location, i.e. to increase the number of spent fuel rods in the volume of an available aqueous storage pool. Similarly there is a need to produce storage racks which reliably resist mechanical vibrations which may be applied to the storage rack from whatever source, but particularly to resist seismic vibrations due to local earthquake conditions.

STATEMENT OF THE INVENTION

According to the present invention an improved storage rack for nuclear fuel assemblies not only permits an increase in the number of fuel rod assemblies which can be confined in an established volume of aqueous storage pool, but also uniquely resists mechanical vibrations. The improved storage rack includes an array of individual metal storage cells having a polygon cross-section, preferably square or rectangular, which are spaced apart by means of at least one layer of neutron poison material. The individual cells are rigidly connected to each other with one or more layers of neutron poison material interposed therebetween.

The individual storage cells are steel tubes with embossed buttons in an array. Tubes are aligned and are secured together by welding engaged buttons. The neutron-poison material covers one or both of the confronting surfaces of the tubes except in the region of the buttons.

The layer or layers of neutron posion material covers a major portion, but less than all of each surface of each tube. The layer of neutron-poison material preferably is a resilient, flexible ribbon of rubber-like material which can be compressed between abutting tubes.

DESCRIPTION OF THE DRAWINGS

FIG. 1 is a perspective view of a portion of a typical aqueous storage pool for spent nuclear fuel assemblies showing a typical storage rack.

FIG. 2 is a fragmentary perspective view of a partial assembly of the storage rack of FIG. 1.

DESCRIPTION OF THE PREFERRED EMBODIMENTS

Figure 3:
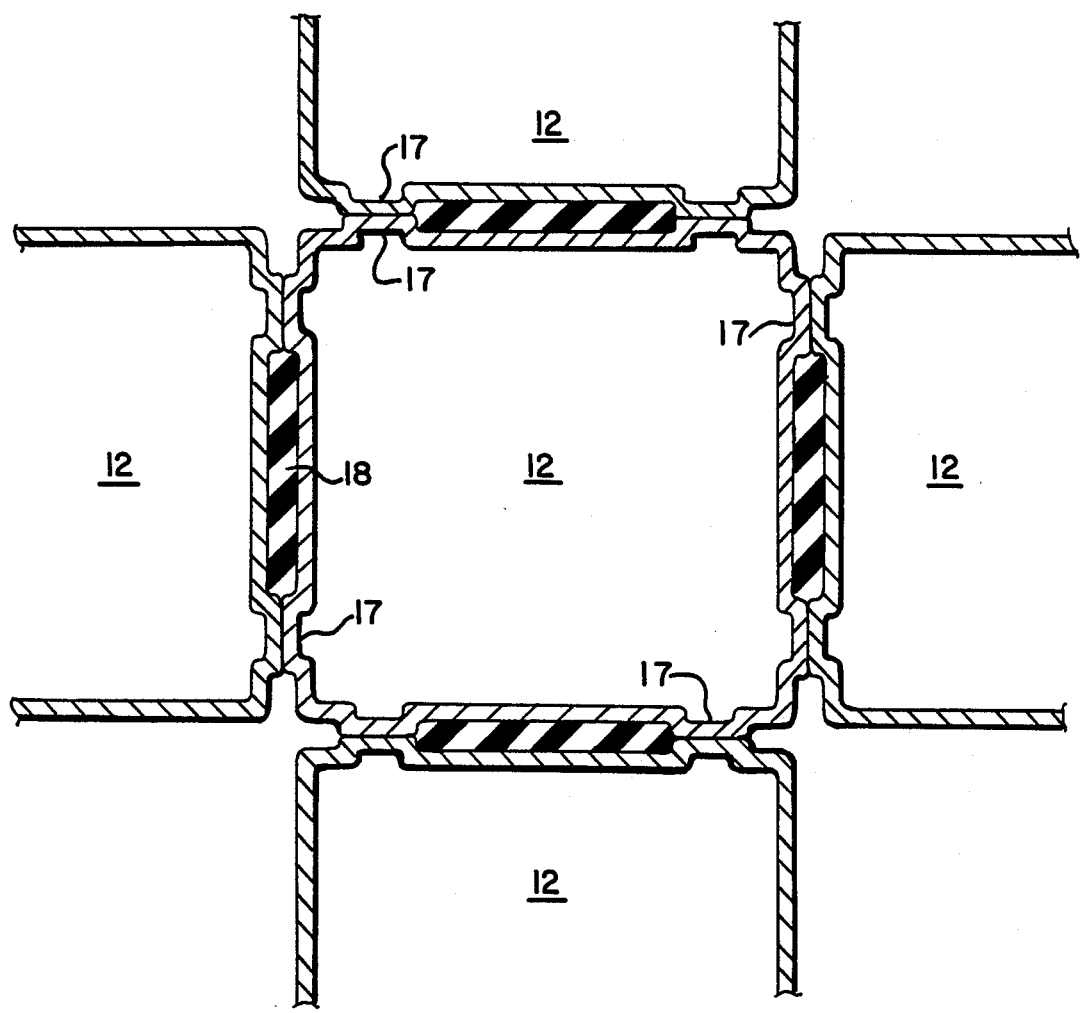
FIG. 3 is a horizontal fragmentary cross-section view of the assembled storage rack.

As shown in FIG. 1, a water storage pool 10 is usually recessed in the ground adjacent to a nuclear power generating facility. A storage rack 11 for spent nuclear fuel assemblies is secured in the pool 10 by appropriate mounting brackets (not shown). The storage rack 11 correspondingly is from 2.4 to 4.5 meters deep to accommodate the fuel rod assemblies which are to be confined within the storage pool 10.

In a preferred embodiment of the invention as shown in FIG. 2, the individual storage cells are tubes 12 having a square cross-section including cell walls 13, 14, 15, 16. The cells are usually fabricated from steel, for example, steel sheets of about 2.3 millimeters thickness. The cell walls 13, 14, 15, 16 are about 15 centimeters wide. The cell walls are provided with an array of embossed buttons 17, each of which is pressed outwardly from the tube 12. Each button surface is about 10 to 20 millimeters diameter. Each button 17 is embossed about 0.5 to 2.0 millimeters from the cell wall. The array of embossed buttons is such that the buttons of one tube will engage the buttons of the confronting, aligned tube so that the two cells can be secured together by welding through the engaged buttons. The outside surfaces of the confronting cell walls are thus spaced-apart by the thickness of the two engaged buttons, i.e., by about 1 to 4 millimeters.

The space between abutting tubes 12 is filled with neutron-poison material 18 which may be applied as a preformed ribbon 19 as shown in FIG. 2. The individual ribbons 19 of neutron poison material have an area which exceeds a major portion but is less than all of the surface area of the tube 12. Preferably the neutron poison material is a Boroflex composition ribbon which is a silicone rubber having boron carbide homogenously dispersed therein. The ribbon 19 has edge scallops 20 to accomodate the embossed buttons 17. The ribbon 19 is less that 4 millimeters thick, preferably about 2 to 3 millimeters thick in its uncompressed state.

After a number of slab-like structures 20 of tubes 12 as shown in FIG. 2 are prepared, they are aligned and secured together by means of fusion welding the engaged buttons 17. Pads 19 of neutron-poison material are positioned between the confronting tubes 12 of each slab of tubes before the welding is carried out. The resulting structure is a multicellular storage rack which optimizes the utilization of available volume in the aqueous storage pool 10. It will be observed that each individual tube 12 as shown in FIG. 3 is essentially completely surrounded with neutron poison material whereby each individual tube 12 can accommodate nuclear fuel assemblies. It will further be observed from an inspection of FIG. 3 that the overall assembly is a rigid three-dimensional network wherein the pads 18 of neutron poison material function as a damping ingredient for mechanical vibrations such as seismic vibrations which may be transmitted through the water storage pool 10 to the storage racks.

The mechanical damping is enhanced if the neutron-poison pads 18 are compressed between confronting cell walls as the tubes are welded together through the buttons 17.

The neutron-poison material may be an adherent coating applied directly to the tubes 12 instead of a pre-formed pad 19 of material. Such coatings may be spray-on, roll-on, trowel-on and other similar adherent coatings.

While square cross-section tubes are illustrated herein, other nestable polygon cross-section tubes may be used with this invention, e.g., rectangular, triangular, hexagonal, and other polygon shapes.

I claim:

1. A storage rack for nuclear fuel assemblies comprising a plurality of nestable storage tubes, each having a polygon cross-section;
    said tubes being nested with cell walls of one tube aligned with and confronting cell walls of other tubes;
    each said cell wall having an array of embossed buttons so arranged that buttons of one cell wall engage buttons of a confronting cell wall, and the engage buttons are welded together to secure the tubes;
    at least one layer of neutron-poison material comprising a flexible, resilient pad interprosed between the aligned cell walls;
    whereby a major portion of the total outer surface area of each confronting cell wall is engaged with said layer of neutron-poison material.

2. The storage rack of claim 1 wherein the said resilient pad is compressed between confronting cell wall surfaces.

3. The storage rack of claim 1 wherein the said resilient pad has an uncompressed thickness less than 4 millimeters.

4. The storage rack of claim 1 wherein the said buttons are embossed by 0.5 to 2.0 millimeters and the spacing between connected cell walls is 1 to 4 millimeters.

5. The storage rack of claim 1 wherein the said pad is a silicone rubber having boron-carbide homogeneously dispersed therethrough.

6. The storage rack of claim 1 wherein each cell wall has an adherent coating of neutron-poison material.

7. A storage rack for nuclear fuel assemblies comprising a plurality of nestable storage tubes, each having a polygon cross-section;
    said tubes being nested with cell walls of one tube aligned with and confronting cell walls of other tubes;
    each said cell wall having an array of embossed buttons so arranged that the buttons of one cell wall engage buttons of a confronting cell wall, and the engaged buttons are welded together to secure the tubes;
    at least one layer of neutron poison material comprising a flexible, resilient pad interposed between the aligned cell walls;
    whereby a major portion of the total outer surface area of each confronting cell wall is engaged with said layer of neutron poison material;
    said neutron poison material comprising a flexible, resilient pad being disposed between aligned cell walls and providing a damping ingredient for mechanical vibrations transmitted to the storage rack.

* * * * *